United States Patent

Chang et al.

[11] Patent Number: 5,955,549
[45] Date of Patent: Sep. 21, 1999

[54] CROSSLINKED POLY(AMINO ACIDS) AND METHOD OF PREPARATION

[76] Inventors: Ching-Jen Chang, 105 Jem Dr., Ambler, Pa. 19002; Graham Swift, 215 Winged Foot Dr., Blue Bell, Pa. 19442

[21] Appl. No.: 09/078,743

[22] Filed: May 14, 1998

Related U.S. Application Data

[60] Provisional application No. 60/047,916, May 29, 1997.

[51] Int. Cl.$^6$ .................................................. C08F 283/00
[52] U.S. Cl. .......................... 525/418; 525/419; 525/420; 525/435; 528/328; 528/345; 528/360; 528/363
[58] Field of Search ...................................... 525/418, 419, 525/420, 435; 528/328, 363, 345, 360

[56] References Cited

U.S. PATENT DOCUMENTS

| | | | |
|---|---|---|---|
| 4,541,871 | 9/1985 | Obayashi et al. | 106/193.1 |
| 4,654,789 | 3/1987 | Dabi | 395/500 |
| 5,284,936 | 2/1994 | Donachy et al. | 530/350 |
| 5,510,426 | 4/1996 | Wood | 525/435 |
| 5,525,682 | 6/1996 | Nagatomo et al. | 525/420 |
| 5,552,516 | 9/1996 | Ross et al. | 528/363 |
| 5,641,855 | 6/1997 | Scherr et al. | 528/310 |

FOREIGN PATENT DOCUMENTS

| | | |
|---|---|---|
| 683177 | 11/1995 | European Pat. Off. . |
| 802215 A1 | 10/1997 | European Pat. Off. . |

*Primary Examiner*—Terressa Mosley
*Attorney, Agent, or Firm*—Thomas J. Howell

[57] ABSTRACT

Crosslinked poly(amino acids) useful as superabsorbent polymers and an improved process for preparing the crosslinked poly(amino acids) is disclosed. Use of polyaziridine and polyepoxide crosslinkers allows the production of superabsorbent polymers that is free of special handling steps required to process hydrogel materials using conventional preparation methods.

11 Claims, No Drawings

CROSSLINKED POLY(AMINO ACIDS) AND METHOD OF PREPARATION

This application claims the benefit of U.S. Provisional Application Ser. No. 60/047,916 filed May 29, 1997.

BACKGROUND

This invention relates to crosslinked poly(amino acids) and improved methods to prepare the crosslinked poly (amino acids). In particular, this invention relates to the use of polyaziridines and polyepoxides as crosslinkers for poly (amino acids) to produce superabsorbent polymers under aqueous conditions without handling hydrogel intermediates.

Superabsorbent polymers are capable of absorbing large quantities of water and aqueous solutions, in particular physiological saline solutions, and find use in a variety of applications including, for example, sanitary goods, hygienic materials, water retaining agents and controlled release vehicles. Superabsorbent polymers are generally water-soluble polymers that have been rendered insoluble by a crosslinking process, resulting in a swellable polymer capable of absorbing many times its original weight in water or aqueous solutions, typically at least 20 times the original weight of the superabsorbent. Superabsorbent polymers are generally polyanionic and hydration of charged moeities in the crosslinked polymer provide the driving force for absorbent properties.

Conventional superabsorbent polymers include, for example, poly(carboxylic acids) such as poly(acrylic acids), hydrolyzed acrylonitrile polymers, poly(vinyl alcohols) and starch-acrylic acid graft polymers. U.S. Pat. Nos. 4,541,871 and 4,645,789 disclose the use of polyepoxide and polyaziridinyl compounds, respectively, to provide water-absorbent polyelectrolytes based on acrylic acid. However, water-absorbent polymers based on acrylic acid backbone chemistry have the disadvantage of not being readily biodegradable and thus contribute a burden to the enviroment when they are disposed of or released into effluent streams.

Attempts to provide biodegradable superabsorbent polymers include the crosslinking of polysuccinimide (hereinafter referred to as PSI) followed by hydrolysis, where the reaction of PSI with the crosslinking agent typically requires a non-aqueous solvent, and hydrolysis of the partially crosslinked PSI to the amino acid derivative involves special handling procedures for the hydrogel intermediates (for example, U.S. Pat. No. 5,525,682). U.S. Pat. No. 5,284,936 discloses the preparation of crosslinked poly (amino acids) by thermal crosslinking of polyaspartate with aspartate and lysine and subsequent hydrolysis to provide superabsorbent polymers.

The present invention seeks to overcome the problems associated with prior art processes used to prepare superabsorbent crosslinked poly(amino acids) that are biodegradable by providing an efficient crosslinking process without the involvement of special handling steps for hydrogel intermediates.

STATEMENT OF INVENTION

The present invention provides a crosslinked poly(amino acid) having the stoichiometric formula $[A]_x[B]_y$, wherein A represents repeat units of backbone polymer structure [1] and B represents crosslinking units of structures [2] or [3] randomly distributed among the units of polymer structure [1] through ester linkage formation with a carboxylate group of radical R,

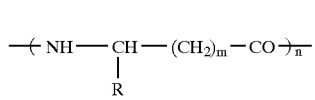

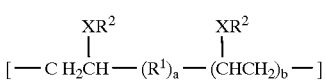

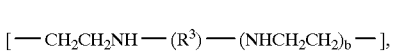

wherein x represents weight percent of A units and y represents weight percent of B units, based on weight of combined A and B units; wherein x is from 80 to 99.9 weight percent and y is from 0.1 to 20 weight percent; m is 0, 1 or 2; n is from 20 to 20,000; R is a radical selected from one or more of $-C(=O)OM$, $-CH_2C(=O)OM$ and $-CH_2CH_2C(=O)OM$, and M is selected from one or more of H, alkali metal ion and alkaline earth metal ion; X is O, S or N; $R^1$ is a residue of a di-, tri- or tetrafunctional group selected from $(C_1-C_4)$alkylene, aryl, arylalkyl and methylene ether of a $(C_6-C_{15})$polyphenol, $(C_2-C_6)$alkanepolyol or poly(alkylene glycol); each $R^2$ is H when X is O or S and each $R^2$ is independently H or $(C_1-C_3)$alkyl when X is N; $R^3$ is a residue of a di-, tri- or tetrapropionate ester of a $(C_2-C_6)$alkanepolyol; a is 0 or 1; and b is 1, 2 or 3.

The present invention further provides a process for preparing crosslinked poly(amino acids) comprising (a) contacting an aqueous solution of poly(aminoacid) with 0.1 to 20 percent by weight of crosslinker, based on weight of poly(amino acid), in a reaction mixture at a pH from 3 to 7, wherein the poly(amino acid) is selected from one or more of poly(aspartic acid) and poly(glutamic acid) and the crosslinker is selected from one or more crosslinkers of formulas [4] and [5],

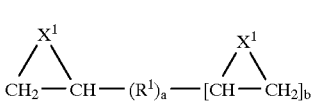

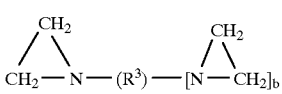

where $X^1$=O, S or $NR^2$; $R^1$, $R^2$, $R^3$, a and b are as described above; (b) removing water from the reaction mixture, (c) subjecting the reaction mixture to a heat treatment, and (d) recovering the crosslinked poly(amino acid) as a solid.

DETAILED DESCRIPTION

The crosslinked poly(amino acids) of the present invention are water-insoluble polymers that are capable of absorbing significant quantities of water, biological fluids or physiological saline solutions. Preferably, the crosslinked poly (amino acids) have a polyanionic backbone, such as poly (aspartic acid) or poly(glutamic acid), with the remainder of the polymer comprising crosslinking elements joined to backbone polymer via reaction with the side chain carboxyl groups. In addition, the crosslinked poly(amino acids) may contain minor amounts of backbone units of optional amino acid residues selected from one or more of glycine, alanine, valine, leucine, isoleucine, phenylalanine, proline, asparagine, glutamine, tyrosine, serine and threonine; typically the optional amino acid units represent less than 10 percent and preferably less than 5 percent by weight, based on weight of the crosslinked poly(amino acid) product. Other optional amino acid residues that may be included in the crosslinked poly(amino acid) in minor amounts include, for example, cysteine, lysine, methionine, histidine, tryptophan and arginine.

As used herein, all percentages referred to will be expressed in weight percent (%) unless specified otherwise. As used herein, the phrase "aqueous composition" or "solution" means aqueous-based compositions or solutions that are substantially aqueous, that is, solvents other than water, such as alcohols, may be present as long they are compatible with or miscible with the aqueous composition or solution.

Generally, the desired degree of crosslinking should be sufficient to render the polymer substantially insoluble in water while still allowing the crosslinked polymer matrix sufficient macromolecular flexibility to absorb aqueous solutions, especially saline solutions, in an amount of at least 3 times, preferably 10 times, more preferaby 20 times and most preferably at least 30 times, the weight of the polymer. The crosslinking reaction occurs between the side chain carboxylate groups of the backbone polymer and the reactive endgroups of the crosslinking agent. The amount of crosslinking units in the crosslinked poly(amino acids) of the present invention is typically from 0.1 to 20%, preferably from 0.2 to 10%, more preferably from 0.5 to 5% and most preferably from 1 to 3%, based on total weight of crosslinked poly(amino acid).

The absorbency properties and degree of crosslinking are controlled by proper selection of the temperature, time and pH parameters used in the preparation of the crosslinked poly(amino acids). For example, the process of the present invention uses temperatures from 80 to 220° C., preferably from 100 to 200° C. and more preferably from 100 to 180° C., for the crosslinking reaction that are typically lower than those disclosed in the prior art using conventional crosslinkers (for example, conditions disclosed in U.S. Pat. No. 5,284,936 involving basic amino acid crosslinkers). In addition, crosslinking reaction times in the process of the present invention are reduced (10 minutes to 3 hours, preferably from 15 minutes to 2 hours and more preferably from 15 minutes to 1 hour) compared to those disclosed in the prior art (for example, 12 to 24 hours in U.S. Pat. No. 5,284,936). Control of the pH during the crosslinking reaction is an important factor in achieving the desired degree of crosslinking and resultant absorbency properties. Typically the pH is from 3 to 7, preferably from 4.0 to 6.5, more preferably from 5.0 to 6.5 and most preferably from 5.5 to 6.0. While not wishing to be bound by theory, we believe that, in the case of the present invention, the disclosed pH range allows protonation of the heteroatom in the 3-membered ring of the crosslinker, thus activating the ring towards ring-opening nucleophilic attack by the side chain carboxylate group of the backbone amino acid polymer; in addition, the disclosed pH range provides an environment where a sufficient fraction of the side chain carboxylic acid group exists in the carboxylate form which is required for the nucleophilic ring-opening reaction with the crosslinker while at the same time minimizing competing hydrolysis of the 3-membered ring in the aqueous environment.

The crosslinked poly(amino acids) of the present invention may be conveniently prepared without processing of hydrogel intermediates. An aqueous solution of one or more poly(amino acid) backbone polymers, adjusted to the desired pH range, is placed in a reaction vessel and an aqueous solution of the crosslinking agent is added to the reaction mixture with agitation at ambient temperature (about 20° C.) up to about 80° C. (step (a)). After brief agitation, the reaction mixture is then transferred to a drying apparatus, for example an oven or freeze-drying system, to remove volatile components (step (b)).

Typically, the reaction mixture is frozen with an acetone-solid carbon dioxide (dry ice) mixture (to about $-30°$ C.) and subjected to vacuum (down to 7 pascals, corresponding to 50 microns or 0.05 millimeters (mm) Hg) for 2 to 24 hours to remove volatiles during which the temperature starts to approach ambient temperature. The solid reaction product is then broken into small particulates, preferably to a powder, and heat treated at 100 to 200° C., preferably from 100 to 180° C., for 15 to 90 minutes to complete the crosslinking reaction (step (c)). The crosslinked poly(amino acid) is then cooled to ambient temperature and recovered; the solid may be ground to a powder if desired.

Alternatively the reaction mixture may be placed in an oven (forced air-flow) to simultaneously dry and crosslink the polymer (combination of steps (b) and (c)). In this case, the heat treatment is typically for 30 minutes to 2 hours, preferably from 30 to 90 minutes, at 120 to 220° C., preferably from 150to 200° C., depending on surface area of the mixture and air flow rate of the oven.

The process of the present invention does not involve separate hydrolysis steps such as those frequently encountered in the processes of the prior art. For example, hydrolyses are frequently required in conventional processes to "activate" or "re-open" cyclic imide structures that form during crosslinking or are initially present in starting materials (for example, PSI); unless hydrolysis is used to cleave these imide structures absorbency properties of the polymers are diminished due to the reduction in available carboxylate sites for hydration. The process of the present invention does not use "imide-containing" starting materials in the crosslinking process; thus, there is no need for reactivation of the carboxylate sites by hydrolysis.

The crosslinked poly(aminoacids) of the present invention are polymers comprising a backbone having repeating amino acid monomer units of structure [1], having been randomly crosslinked with the reactive materials of formulas [4] or [5]. The materials of formulas [4] and [5] crosslink by reaction with carboxylate sites in the R groups of structure [1]. Suitable crosslinkers include water-soluble or water-dispersible polyepoxides and polyaziridines. As used herein, the term "water-soluble," as applied to crosslinkers, indicates that the crosslinker has a solubility of at least about 1 gram (g) crosslinker per 100 g water. Solubility or dispersibility of the crosslinkers in an aqueous composition is necessary to allow access of the crosslinker to the poly (amino acid), otherwise the rate and degree of crosslinking is insufficient to be of practical use.

Suitable crosslinking agents useful in preparing the crosslinked poly(amino acids) of the present invention include polyglycidyl ethers of ($C_2$–$C_6$)alkanepolyols and poly(alkylene glycols) such as, for example, ethylene glycol diglycidyl ether, diethylene glycol diglycidyl ether, polyethyleneglycol diglycidyl ether, glycerine diglycidyl ether and triglycidyl ether, propylene glycol diglycidyl ether and butanediol diglycidyl ether. Additional crosslinkers of this type, include, for example, polyglycidyl ethers of erythritol, trimethylolethane and trimethyolpropane.

Additional suitable crosslinking agents include ($C_4$–C8) diepoxyalkanes and diepoxyaralkanes such as, for example, 1,2,3,4-diepoxybutane, 1,2,4,5-diepoxy-pentane, 1,2,5,6-diepoxyhexane, 1,2,7,8-diepoxyoctane, 1,4- and 1,3- divinyl-benzene diepoxides; ($C_6$–$C_{15}$)polyphenol polyglycidyl ethers such as, for example, 4,4'-isopropylidenediphenol diglycidyl ether (bisphenol A diglycidyl ether) and hydroquinone diglycidyl ether.

Use of the above crosslinking agents results in crosslinkage structure [2] where $R^1$ is, for example, bis-($C_1$–$C_4$) alkylene, 1,4-phenyl, 1,3-phenyl, di(methylene) ether of ethylene glycol, di(methylene) ether of hydroquinone or di(methylene) ether of 4,4'-isopropylidenediphenol.

Another class of suitable crosslinking agents includes polyaziridinyl derivatives of ($C_2$–$C_6$)alkanepolyols such as, for example, pentaerythritol-tris-[β-(N-aziridinyl)propionate], trimethylolpropane-tris[β-(N-aziridinyl)propionate], pentaerythritol-bis[β-(N-aziridinyl)propionate] and trimethylolpropane-bis-[β-(N-aziridinyl)propionate]. Of particular use are the polyaziridinyl derivatives of propionate esters of erythritol, pentaerythritol, trimethylolethane and trimethyolpropane which are prepared by addition of aziridine to the corresponding acrylate esters of the polyols. Polyaziridinyl derivatives of the polypropionate esters of pentaerythritol, trimethylolethane and trimethyolpropane are represented by structure [6], where w=2, 3 or 4; $R^4$=methyl or ethyl; z=0 or 1, and w+z=maximum of 4.

[6]

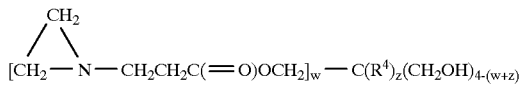

When crosslinkers of formulas [4] or [5] are contacted with backbone polymers of structure [1], the resulting ester-type crosslinkage can be represented by structures [2A] or [3A], respectively. Only two attachment sites are shown in structures [2A] and [3A] for the crosslinking moiety; however, it is understood that as many as 3 or 4 attachment sites may occur per crosslinkage, depending upon the nature of the $R^1$ and $R^3$ groups (see formulas [4] and [5]).

[2A]

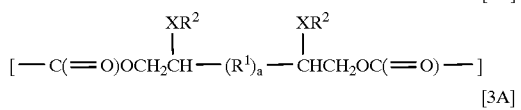

[3A]

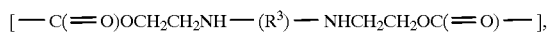

Preferred crosslinkers are ethylene glycol diglycidyl ether, diethylene glycol diglycidyl ether, 1,2,3,4-diepoxybutane, 4,4'-isopropylidenediphenol diglycidyl ether, hydroquinone diglycidyl ether, pentaerythritol-tris-[β-(N-aziridinyl)propionate and trimethylolpropane-tris[β-(N-aziridinyl)propionate; most preferred are ethylene glycol diglycidyl ether and pentaerythritol-tris[β-(N-aziridinyl)propionate.

The preferred poly(amino acids) used to prepare the crosslinked poly(amino acid) superabsorbents of the present invention are poly(aspartic acid) and poly(glutamic acid); the poly(amino acids) are preferably used in the alkali metal salt form, for example sodium or potassium salts (M=Na or K in structure [1]). Number average molecular weights ($M_n$) of the poly(amino acids) used in the preparation of the crosslinked superabsorbent polymers are typically from 3,000 to 2,000,000, preferably from 15,000 to 1,000,000 and more preferably from 40,000 to 500,000. Corresponding weight average molecular weights ($M_w$) are typically from 6,000 to 4,000,000, preferably from 30,000 to 2,000,000 and more preferably from 60,000 to 1,000,000. Molecular weights were determined by aqueous phase GPC (gel permeation chromatography) using a TosoHaas GMPWXL column with 0.05M sodium acetate as mobile phase with refractive index detector. Correspondingly, the value of n in structure [1] is typically from 20 to 20,000, preferably from 100 to 10,000, and more preferably from 200 to 5,000.

Abbreviations used in the Examples and Tables are listed below with the corresponding descriptions. The PETAP crosslinker is represented by structure [7], which corresponds to structure [6], where w=3, z=0.

SPA=Sodium polyaspartate
EGDGE=Ethylene glycol diglycidyl ether
PETAP=Pentaerythritol-tris[β-(N-aziridinyl)propionate]

[7]

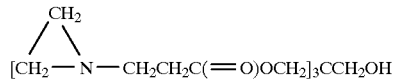

Some embodiments of the invention are described in detail in the following Examples. All ratios, parts and percentages (%) are expressed by weight unless otherwise specified, and all reagents used are of good commercial quality unless otherwise specified.

EXAMPLE 1

General Method for Preparing Crosslinked Poly(amino acids)

To 29.6 milliliter (1-ounce) vials containing a magnetic stirring bar were added 10.0 grams (g) of an aqueous solution of sodium polyaspartate (SPA, approximately 10% solids) at pH=5 to 6.5. Each of the vials was then treated with various amounts of crosslinker (50% aqueous solution) while stirring the mixture. The crosslinkers were added dropwise using a Pasteur pipette (0.5-5% of PETAP or EGDGE, based on weight of SPA) and the mixtures were stirred vigorously for 5 minutes. The contents of each vial were transferred to a freeze-drying vial and the samples were frozen using an acetone-solid carbon dioxide (dry-ice) mixture. The samples were then dried by placement in a freeze-dry system (Labconco Freeze Dry System/Lyph Lock 4.5) and volatiles were removed using a 24-hour vacuum treatment. The samples were then ground to powders, heat treated for 30 minutes at 180° C., allowed to cool under vacuum or inert atmosphere (nitrogen) and tested for absorbency (in 0.9% aqueous sodium chloride) using the test method described in Example 16.

EXAMPLE 2–15

In a manner according to that described in Example 1, different crosslinkers (XL) and different levels of crosslinker (%XL) were mixed with SPA and the resultant polymers were evaluated for absorbency according to the method described in Example 16. A summary of reaction parameters used in crosslinking the SPA (XL, %XL, pH, $M_w$ of SPA) and corresponding absorbency performance is presented in Table 1. Commercially available superabsorbents based on crosslinked poly(acrylic acid) typically have 15-second and 10-minute absorbencies of 20–40 g/g and 40–60 g/g, respectively.

EXAMPLE 16

The crosslinked SPA (0.2 g) of Examples 2–15 was uniformly distributed in a "tea bag" (5 centimeters (cm) x 5 cm) of nonwoven fabric and heat sealed. The tea bag was immersed in a 0.9% aqueous sodium chloride solution (physiological saline) for 15 seconds, followed by 1 minute of drip-drying and then weighed. The tea bag was then reimmersed in the saline solution for 2 minutes-45 seconds, followed by 1 minute of drip-drying and reweighing. A final immersion for 7 minutes, followed by drip-drying and reweighing generated absorbency properties for different crosslinked poly(amino acids) corresponding to 15 seconds, 3 minute and 10 minute values, respectively. The same procedure was repeated for the tea bag alone (without sample) to determine a "blank" value to be subtracted from the weight of the soaked tea bag containing samples. Absorbency was expressed as g saline solution absorbed per g of crosslinked poly(amino acid), based on the following equation: absorbency (g/g)=[(weight of wet tea bag with treated sample)—(weight of wet tea bag without sample)]/[weight of sample]. Absorbency data are presented in Table 1 for various crosslinked poly(amino acids); 15-second absorbency data give an indication of the rate at which the crosslinked poly(amino acids) are able to absorb aqueous solutions (kinetic absorbency) and the 10-minute values estimate the capacity of the crosslinked poly(amino acids) to absorb aqueous solutions (equilibrium absorbency).

TABLE 1

| Ex# | $M_w$ | pH | % XL | XL | Absorbency 15-sec (g/g) | Absorbency 10-min (g/g) |
|---|---|---|---|---|---|---|
| 2 | 33,000 | 6.5 | 0.5 | EGDGE | <1 | <1 |
| 3 | 33,000 | 6.5 | 2.5 | EGDGE | <1 | <1 |
| 4 | 33,000 | 6.0 | 0.5 | EGDGE | 2 | 20 |
| 5 | 33,000 | 6.0 | 2.5 | EGDGE | 12 | 24 |
| 6 | 33,000 | 5.5 | 0.5 | EGDGE | 1 | 7 |
| 7 | 33,000 | 5.5 | 2.5 | EGDGE | 12 | 22 |
| 8 | 33,000 | 5.0 | 0.5 | EGDGE | 1 | 15 |
| 9 | 33,000 | 5.0 | 2.5 | EGDGE | 15 | 21 |
| 10 | 69,800 | 5.5 | 0.5 | EGDGE | 11 | 16 |
| 11 | 69,800 | 5.5 | 1.0 | EGDGE | 44 | 49 |
| 12 | 69,800 | 5.5 | 2.5 | EGDGE | 15 | 20 |
| 13 | 69,800 | 5.5 | 1.0 | PETAP | 39 | 43 |
| 14 | 69,800 | 5.5 | 2.0 | PETAP | 35 | 38 |
| 15 | 69,800 | 5.5 | 5.0 | PETAP | 18 | 24 |

We claim:

1. A crosslinked poly(amino acid) having the stoichiometric formula:

$$[A]_x[B]_y,$$

wherein A represents repeat units of backbone polymer structure [1] and B represents crosslinking units of structures [2] or [3] randomly distributed among the units of polymer structure [1] through ester linkage formation with a carboxylate group of radical R,

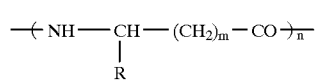
[1]

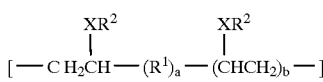
[2]

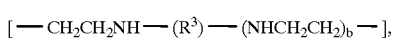
[3]

wherein x represents weight percent of A units and y represents weight percent of B units, based on weight of combined A and B units; wherein x is from 80 to 99.9 weight percent and y is from 0.1 to 20 weight percent; m is 0, 1 or 2; n is from 20 to 20,000; R is a radical selected from the group consisting of one or more of —C(=O)OM, —CH₂C(=O)OM and —CH₂CH₂C(=O)OM, and M is selected from the group consisting of one or more of H, alkali metal ion and alkaline earth metal ion; X is O, S or N; $R^1$ is a residue of a di-, tri- or tetrafunctional group selected from ($C_1$–$C_4$)alkylene, aryl, arylalkyl and methylene ether of a ($C_6$–$C_5$)polyphenol, ($C_2$–$C_6$)alkanepolyol or poly(alkylene glycol); each $R^2$ is H when X is O or S and each $R^2$ is independently H or ($C_1$–$C_3$)alkyl when X is N; $R^3$ is a residue of a di-, tri- or tetrapropionate ester of a ($C_2$–$C_6$) alkanepolyol; a is 0 or 1; and b is 1, 2 or 3.

2. The crosslinked poly(amino acid) of claim 1 wherein $R^1$ is selected from the group consisting of one or more of bis-($C_1$–$C_4$)alkylene, 1,4-phenyl, 1,3-phenyl, di(methylene) ether of ethylene glycol, di(methylene) ether of hydroquinone and di(methylene) ether of 4,4'-isopropylidenediphenol.

3. The crosslinked poly(amino acid) of claim 1 wherein n is from 200 to 5,000.

4. The crosslinked poly(amino acid) of claim 1 wherein y is from 1 to 3 weight percent.

5. A process for preparing crosslinked poly(amino acids) comprising:

(a) contacting an aqueous solution of poly(aminoacid) with 0.1 to 20 percent by weight of crosslinker, based on weight of poly(amino acid), in a reaction mixture at a pH from 3 to 7, wherein the poly(amino acid) is selected from the group consisting of one or more of poly(aspartic acid) and poly(glutamic acid) and the crosslinker is selected from the group consisting of one or more crosslinkers of formula [4] and [5],

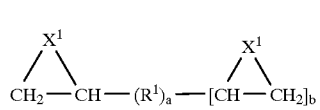
[4]

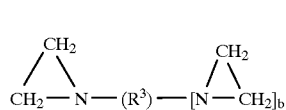
[5]

where $X^1$=O, S or $NR^2$, $R^1$=a residue of a di-, tri- or tetrafunctional group selected from ($C_1$–$C_4$)alkylene, aryl, arylalkyl and methylene ether of a ($C_6$–$C_{15}$)polyphenol, ($C_2$–$C_6$) alkanepolyol or poly(alkylene glycol);

$R^2$=H or ($C_1$–$C_3$)alkyl, $R^3$=a residue of a di-, tri- or tetrapropionate ester of a ($C_2$–$C_6$)alkanepolyol, a=0 or 1, and b=1, 2 or 3, (b) removing water from the reaction mixture, (c) subjecting the reaction mixture to a heat treatment, and (d) recovering the crosslinked poly(amino acid) as a solid.

6. The process according to claim 5 wherein the pH is from 5 to 6.5.

7. The process according to claim 5 wherein the crosslinker is selected from the group consisting of one or more of ethylene glycol diglycidyl ether, diethylene glycol diglycidyl ether, 1,2,3,4-diepoxybutane, 4,4'-isopropylidene-diphenol diglycidyl ether, hydroquinone diglycidyl ether, pentaerythritol-tris[β-(N-aziridinyl) propionate] and trimethylolpropane-tris[β-(N-aziridinyl)-propionate].

8. The process according to claim 5 wherein water is removed from the reaction mixture by freeze-drying followed by a heat treatment conducted at 100 to 200° C. for 15 minutes to 90 minutes before recovery of the crosslinked poly(amino acid).

9. The process according to claim 5 wherein steps (b) and (c) are combined into one step by heating the reaction mixture in an oven at 120 to 220° C. for 30 minutes to 2 hours before recovery of the crosslinked poly(amino acid).

10. The process according to claim 5 wherein the weight percent of crosslinker is from 0.5 to 5 percent, based on weight of poly(amino acid).

11. The process according to claim 5 wherein the weight percent of crosslinker is from 1 to 3 percent, based on weight of poly(amino acid).

* * * * *